(12) United States Patent
Murakami

(10) Patent No.: US 10,997,811 B2
(45) Date of Patent: May 4, 2021

(54) AUTHENTICATION SYSTEM

(71) Applicant: DENSO WAVE INCORPORATED, Aichi-pref. (JP)

(72) Inventor: Seiji Murakami, Aichi-pref. (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 16/711,508

(22) Filed: Dec. 12, 2019

(65) Prior Publication Data

US 2020/0202653 A1 Jun. 25, 2020

(30) Foreign Application Priority Data

Dec. 25, 2018 (JP) .............................. JP2018-241061

(51) Int. Cl.
*G07C 9/28* (2020.01)
*G06F 1/3231* (2019.01)

(52) U.S. Cl.
CPC ............ *G07C 9/28* (2020.01); *G06F 1/3231* (2013.01)

(58) Field of Classification Search
None
See application file for complete search history.

(56) References Cited

U.S. PATENT DOCUMENTS

| | | | |
|---|---|---|---|
| 10,733,275 B1* | 8/2020 | Knas | G06K 9/00617 |
| 10,735,414 B1* | 8/2020 | Ketharaju | H04L 63/10 |
| 2013/0227651 A1* | 8/2013 | Schultz | H04L 63/0861 |
| | | | 726/4 |
| 2019/0357050 A1* | 11/2019 | Kennedy-Foster | |
| | | | H04L 63/0853 |

FOREIGN PATENT DOCUMENTS

JP      2013-068026 A      4/2013

* cited by examiner

*Primary Examiner* — Adolf Dsouza
(74) *Attorney, Agent, or Firm* — Harness, Dickey & Pierce, P.L.C.

(57) ABSTRACT

An authentication system includes a portable terminal carried by a user, a controller that authenticates the portable terminal, and a human detection portion that is configured to detect a person existing within a predetermined detection range. The portable terminal includes a terminal-side communication portion that communicates with the controller and transmits an authentication request signal, which requests authentication of the portable terminal. The controller performs a normal-time notification process that notifies a message in which the portable terminal is authenticated, in response to that a predetermined operation is performed on an operation area after the portable terminal has been authenticated in a authentication process.

5 Claims, 6 Drawing Sheets

AUTHENTICATION SYSTEM

CROSS REFERENCE TO RELATED APPLICATIONS

The present application claims the benefit of priority from Japanese Patent Application No. 2018-241061 filed on Dec. 25, 2018. The entire disclosures of all of the above applications are incorporated herein by reference.

TECHNICAL FIELD

The present disclosure relates to an authentication system including a portable terminal carried by a user and a controller that authenticates the portable terminal.

BACKGROUND

In a security system used for crime prevention measures such as in a store or a house, an authentication system for performing user authentication may be required.

SUMMARY

The present disclosure describes an authentication system including: a portable terminal carried by a user; a controller that authenticates the portable terminal; and a human detection portion that is configured to detect a person existing within a predetermined detection range.

BRIEF DESCRIPTION OF DRAWINGS

Objects, features and advantages of the present disclosure will become more apparent from the following detailed description made with reference to the accompanying drawings. In the drawings.

DETAILED DESCRIPTION

In a security system used for crime prevention measures such as in a store or a house, an authentication system for performing user authentication may be required. As one of authentication systems, there is a system that allows a user to carry out authentication only by a touch operation by holding a portable terminal such as a portable tag. Therefore, such an authentication system includes a portable tag carried by a user and a controller that authenticates the portable terminal.

Figure 5:
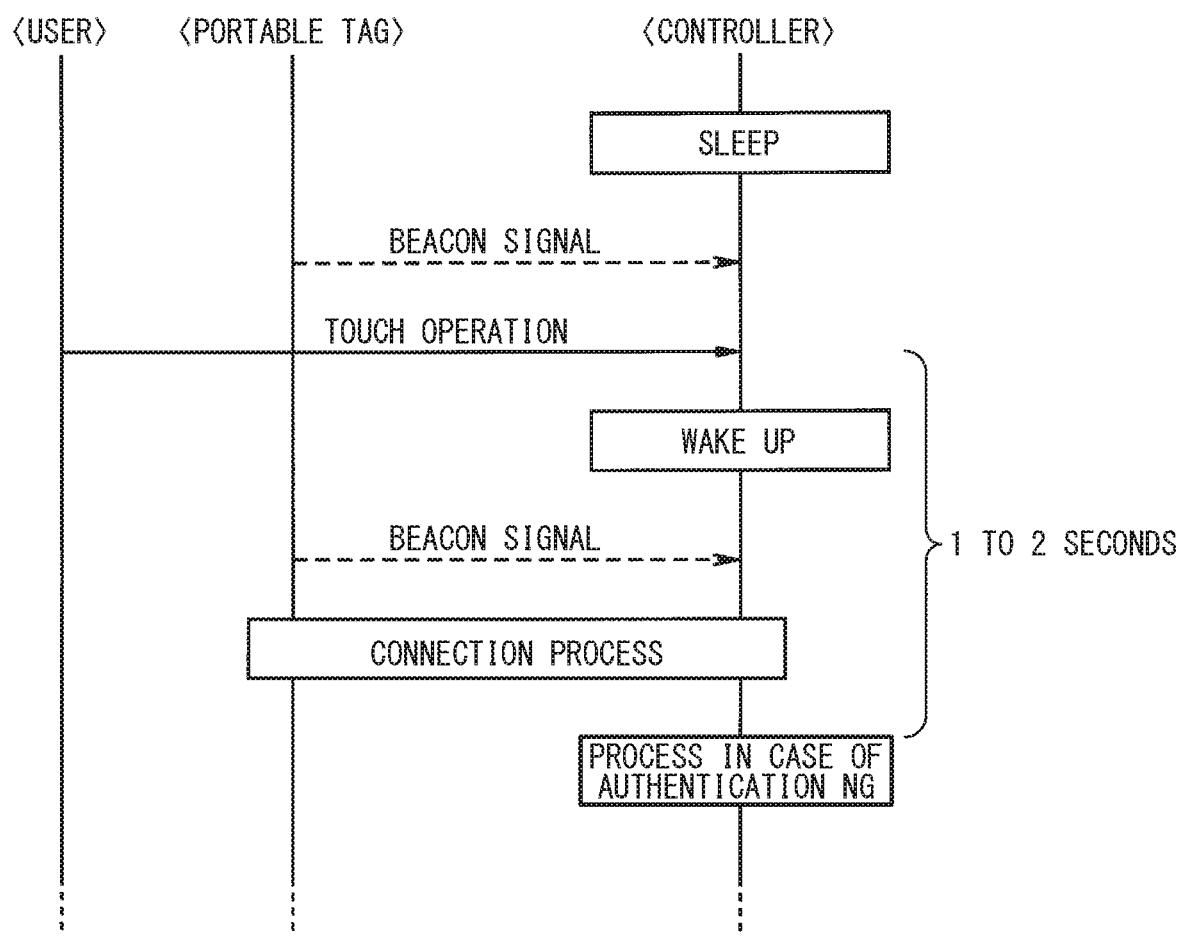
FIG. 5 is a diagram explaining flow of authentication by an authentication system.
Figure 6:
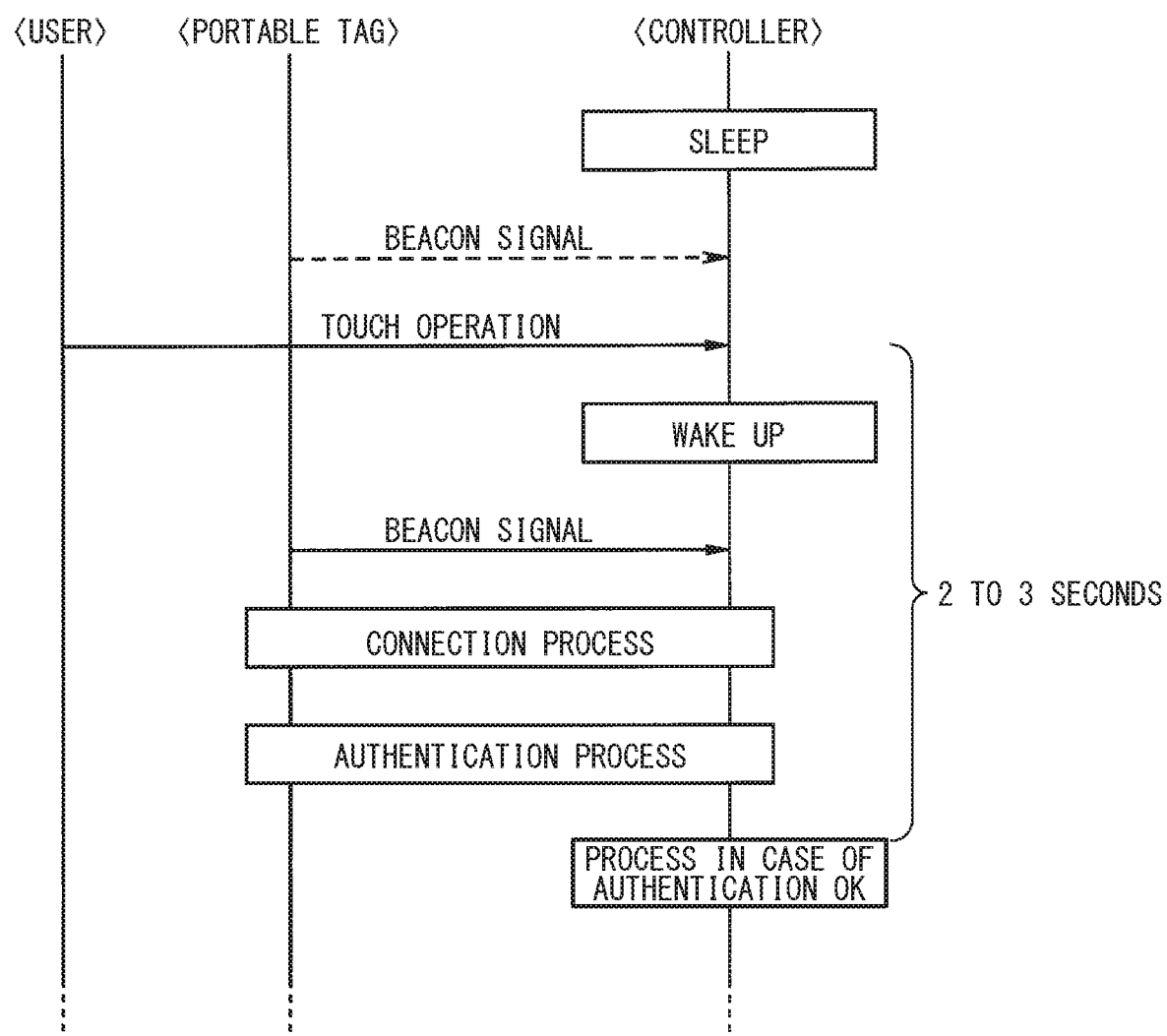
FIG. 6 is a diagram explaining flow of authentication by an authentication system.

In such an authentication system, authentication may be performed according to flow shown in FIG. 5 and FIG. 6, for example. In this case, the portable tag conforms to the BLE (Bluetooth Low Energy) standard. The portable tag transmits a beacon signal periodically, for example, every second.

A controller is normally in a sleep state. The controller has an operation area where the user can touch. When a touch operation is performed on the operation area, the controller wakes up, that is, activates. Incidentally, Bluetooth is a registered trademark.

When the controller receives the beacon signal transmitted from the portable tag after the activation, the controller executes a connection process. The connection process is a process for determining whether the portable tag having transmitted the beacon signal is a device paired with its own device, that is, a registered device, by performing mutual communication with the portable tag. When a person (also referred to as a user) who performed the touch operation does not have a portable tag or the person has a portable tag which is not registered, as shown in FIG. 5, the result of connection process is determined as NG. In this case, processing at the time of authentication NG is executed. Examples of the processing at the time of authentication NG include outputting an error sound such as buzzy sound or beep sound or the like, and outputting a message indicating NG. Incidentally, the authentication NG may mean the authentication is denied, and the authentication OK may mean the authentication is accepted, for example.

When the user has a registered portable tag, as shown in FIG. 6, the controller determines that the portable tag having transmitted the beacon signal is a paired device as a result of the connection process, and performs authentication process. Incidentally, a portable tag may be referred to as a mobile tag. The authentication process is a process of performing authentication of the portable tag, that is, genuineness judgement of the portable tag, by performing mutual communication with the portable tag. As a result of the authentication process, if the authentication of the portable tag that has transmitted the beacon signal is appropriately completed, that is, if the authentication is determined as OK, the controller executes the process at the time of authentication OK. The process at the time of authentication OK is, for example, a process of canceling a crime prevention measure and outputting a message of cancellation to notify the user.

In the authentication system, the controller is in a sleep state until a touch operation is performed, and mutual communication is performed between the controller and the portable tag during authentication. In the authentication system, it will take about 1 to 2 seconds from the time when the touch operation is performed to the time when authentication is NG, and in addition, it will take about 2 to 3 seconds from the time when the touch operation is performed to the time when authentication is OK.

In an authentication system of a related art, a relatively long time of about 3 seconds at the maximum may be required from the time when the touch operation is performed to the time when the processing related to the authentication is completed. From the time when the touch operation is performed to the time when the processing related to authentication is completed, the user simply waits for the end of process. The user will feel this time as a mere waiting time or just a waiting time. Such a waiting time may be preferably as short as possible in consideration of user convenience.

The present disclosure may provide an authentication system enables to reduce a waiting time felt by a user during authentication.

In an authentication system according to a related art, when a user with a portable tag reaches a range where the beacon signal can reach the controller without requiring a touch operation by the user, authentication may be automatically performed, and crime prevention measure may be set or be canceled. However, in the authentication system according to the related art, a predetermined operation such as a touch operation by the user may be required for the following reason.

In other words, in a configuration in which crime prevention measure (referred to as security) setting or cancellation is automatically performed without requiring an operation by the user, authentication, security setting, or cancellation of the security setting may be executed without the user being aware of it. In this case, even when there may be some malfunction in the authentication system or in the security system and even when these systems may not function normally, the user may be difficult to notice such an abnormality.

If the user is caused to perform a predetermined operation, it may be possible to cause the user to execute it while being aware of the setting or release of the crime prevention measure. For example, even if the user performs the predetermined operation with the intention that the crime prevention measure is set, if a predetermined action that should be performed when the crime prevention measure is set is not performed on a system side, the user can recognize a difference between perception by the user and perception by the system, and the user can notice that there may be some sort of malfunction occurs in these systems. Incidentally, the predetermined action is, for example, transmission or displaying of a message indicating that crime prevention measure has been set. In the authentication system, a predetermined operation by the user is indispensable for the recognition matching between the user and the system side. In the authentication system described below, a predetermined operation by the user may be essential.

According to one aspect of the present disclosure, an authentication system comprising: a portable terminal carried by a user; a controller that authenticates the portable terminal; and a human detection portion that is configured to detect a person existing within a predetermined detection range. The portable terminal includes a terminal-side communication portion that communicates with the controller and transmits an authentication request signal, which requests authentication of the portable terminal. The controller includes a controller-side communication portion communicating with the portable terminal, and an operation area that is configured to be operated by the user. The controller is in a sleep state normally. The controller returns from the sleep state to start up to be in an active state in response to the human detection portion detects the person. The controller communicates with the portable terminal through the controller-side communication portion in response to reception of the authentication request signal in the active state and performs an authentication process that authenticates the portable terminal which has transmitted the authentication request signal. The controller performs a normal-time notification process that notifies a message in which the portable terminal is authenticated, in response to that a predetermined operation is performed on the operation area after the portable terminal has been authenticated in the authentication process.

When the authentication request signal is transmitted from the portable terminal under a state where the portable terminal is activated after returning from the sleep state, the controller receives the authentication request signal. Upon receiving the authentication request signal, the controller executes the authentication process for authenticating the portable terminal that has transmitted the authentication request signal by communicating with the portable terminal via the controller-side communication portion. When the portable terminal is authenticated in the authentication process, the controller performs the normal-time notification process for notifying that the portable terminal has been authenticated when a predetermined operation is performed on the operation area.

At least a part of the authentication process may be a process similar to the process in the related art. In the configuration of the present disclosure, the time required for authentication is the time from when the controller receives the authentication request signal to when the normal-time notification process is executed. Therefore, even with the above configuration, the time required for authentication may be substantially the same as the time required for authentication in the related art. In this case, it may be possible to greatly shorten the waiting time felt by the user during authentication.

In the configuration, the time that the user (a person) feels a mere waiting time corresponds to the time from when the user performs a predetermined operation to when the normal-time notification process is executed. The inventor of the present application has paid attention to subjective waiting time for a person, and the configuration of the present disclosure is derived. In the present configuration, when the person is detected by a human detection portion, the controller returns from the sleep state and starts up. Therefore, the controller can complete the authentication process before the user performs the predetermined operation. The sleep state may be referred to as a standby state.

When the portable terminal is authenticated in the authentication process, the controller can immediately execute the normal-time notification process when the predetermined operation is performed by the user. According to the configuration of the present disclosure, prior to the execution of the predetermined operation by the user, the controller is automatically activated to start and execute the authentication process. According to the configuration of the present disclosure, it is possible to perform the authentication process which requires a relatively long time, in advance. Therefore, it is possible to almost eliminate the time from the time when the predetermined operation is performed by the user to the time when the normal-time notification process is executed, that is, the time that the user feels just a waiting time. Therefore, according to the authentication system of the present disclosure, it is possible to greatly shorten the waiting time that the user feels at the time of authentication, as compared with a related authentication system.

If the controller is unable to authenticate the portable terminal in the authentication process, the controller may execute an abnormal-time notification process for notifying that the portable terminal is not authenticated, regardless of the presence or absence of the predetermined operation on the operation area.

According to the configuration, when the user does not have a portable terminal, or when the user has a portable terminal not registered in advance or a portable terminal other than a legitimate terminal, it is possible to notify the user that the authentication is not performed, that is, the authentication NG, before the predetermined operation on the operation area is performed. Incidentally, the legitimate terminal may be referred to as a regular terminal or a formal terminal. According to the configuration, it is possible to improve the response of the authentication system in a case of the authentication NG. In other words, it is possible to shorten the time period require for the response of the authentication system in a case of the authentication NG.

In an authentication system according to a related art, even if a portable terminal other than a legitimate terminal, that is, a malicious third party possessing a fake portable terminal approaches the controller, a message indicative of the authentication NG is not notified unless a touch operation is performed. A threatening effect against such malicious third parties may be insufficient. According to the configuration of the present disclosure, when the malicious third party enters the detection range, it is automatically notified that the authentication is NG. Therefore, according to the authentication system of the present disclosure, it is possible to automatically perform a threatening action against the malicious third party, and it is possible to improve security.

In the authentication system, the controller may be a battery device that operates by receiving power supply from a mounted battery. The human detection portion may be a human sensor that detects a person with infrared rays, and the human sensor may be operated by receiving power supply from the battery mounted on the controller.

According to the configuration of the present disclosure, a general human sensor may be employed as the human detection portion. The human sensor may be a general sensor that is widely used. Since the human sensor has a configuration using infrared rays, power consumption may be kept low. Therefore, according to the configuration of the present disclosure, it is possible to reduce the consumption of the battery of the controller, which is the battery device. That is, it is possible to reduce frequency of battery replacement.

In the authentication system according to an example of the present disclosure, for example, in a situation where a legitimate user having a portable terminal is in a range where communication with the controller is possible and where a person other than the legitimate user performs the predetermined operation with respect to the operation area as the purpose of mischief or the like, the authentication may be achieved even if the user is not the legitimate user, that is, the authentication OK. Therefore, it may be possible to further improve security to a specific situation.

The authentication process may include a first determination process for determining whether the portable terminal having transmitted the authentication request signal is registered in advance, a second determination process for determining genuineness of the portable terminal having transmitted the authentication request signal, and an electric wave field intensity measurement process for measuring the radio field intensity of the signal transmitted from the portable terminal in the second determination process. When a long press operation on the operation area is started in a state where the portable terminal is determined to be registered in advance by the first determination process, the controller may execute the second determination process and the radio wave intensity measurement process.

If both the condition that the portable terminal is determined to be genuine by the second determination process and the condition that the radio field intensity measured by the radio field intensity measurement process is equal to or greater than a predetermined determination threshold are satisfied, the normal-time notification process may be executed after the long press operation on the area ends. Incidentally, the long press operation is not an operation in which an operation target is pressed and released immediately, but is kept pressed for a certain period of time or longer. In general, it may be difficult for a person to perform the long press operation while walking. When performing the long press operation, the user stops at the vicinity of the controller. The vicinity is, for example, a position directly facing the controller.

The determination threshold value may be set to a value approximately equal to the radio wave intensity when the user who has the portable terminal is present near the controller. When the legitimate user performs the long press operation on the operation area, both of the above conditions are satisfied, and the authentication is normally completed. In a situation where the legitimate user is in a range where communication with the controller is possible, and when a person other than the legitimate user performs the long press operation on the operation area, the radio wave intensity becomes less than the determination threshold. In this case, the authentication is not OK.

It is assumed that, when the legitimate user moves so as to pass near the controller, a person other than the legitimate user performs the long press operation on the operation area. In this case, the legitimate user moves away from the vicinity of the controller until the long press operation is completed. Therefore, the radio wave intensity is less than the determination threshold value, so that the authentication is not OK. That is, in this case, since the operation does not end instantaneously and a user is required to perform the long press operation, which requires a certain period of time, it is possible to take time until the legitimate user leaves the vicinity of the controller. Therefore, it is possible to suppress the occurrence of erroneous authentication.

The authentication process may include a radio wave intensity measurement process in addition to the first determination process and the second determination process originally performed for authentication. In the configuration, the time required for the authentication process may be increased by the added radio field intensity measurement process. The predetermined operation on the operation area corresponds to the long press operation. Therefore, according to the configuration, the controller can execute each process such as the second determination process and the radio wave intensity measurement process while the user is performing the long press operation that keeps pressing the operation area for a certain time or longer.

In this case, the time that the user feels just a waiting time corresponds to the time from when the long press operation by the user is completed to when the normal-time notification process is executed. Therefore, the time that the user feels a mere waiting time is almost zero. According to the authentication system of the present disclosure, it is possible to greatly reduce the waiting time felt by the user during authentication. It is possible to improve the security in the specific situation.

Embodiments will be described with reference to the drawings. In each embodiment, substantially the same components are denoted by the same reference numerals and description thereof is omitted.

First Embodiment

Hereinafter, the first embodiment will be described with reference to FIG. 1 to FIG. 3

(Overall Configuration of Authentication System)

Figure 1:
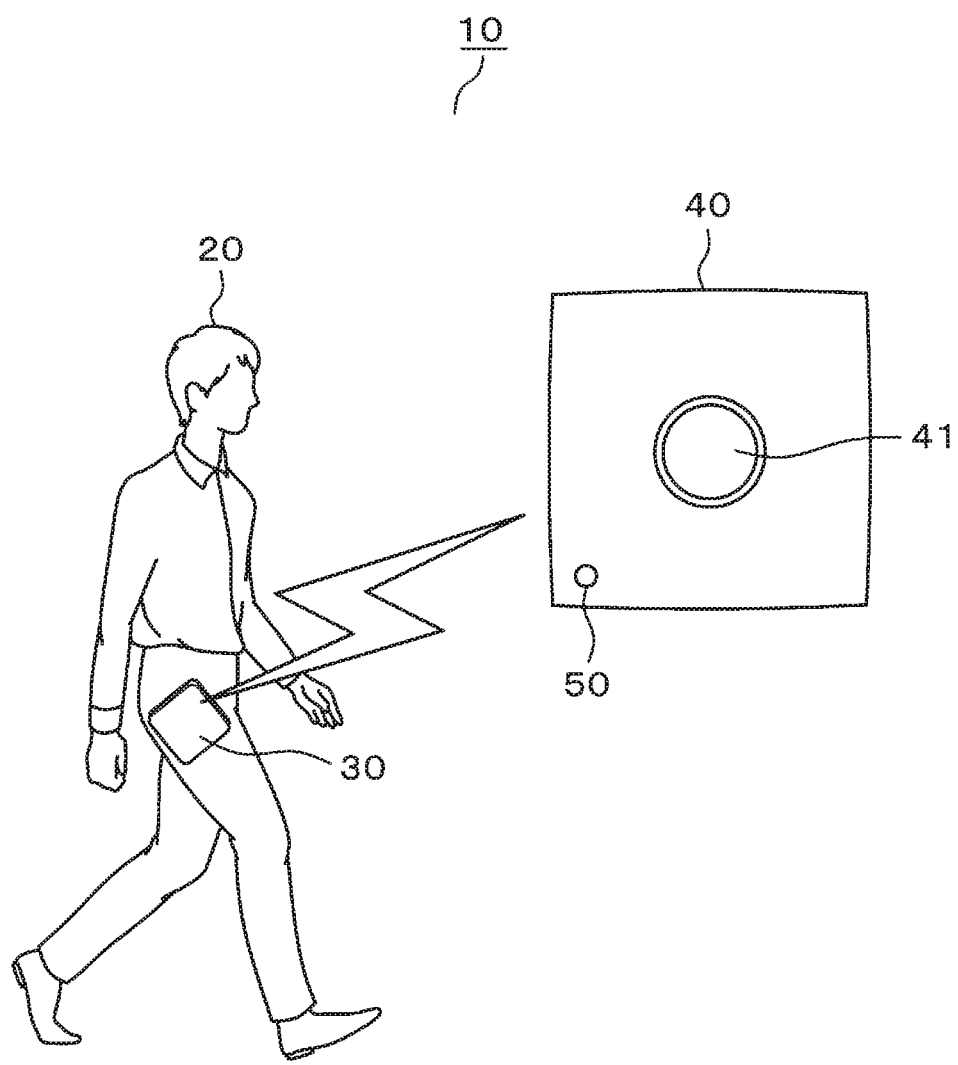
FIG. 1 is a diagram schematically showing a configuration of an authentication system according to a first embodiment.

An authentication system 10 shown in FIG. 1 is used in, for example, a security system used for crime prevention measures for a house. The authentication system 10 includes a portable tag 30 that is a portable terminal carried by a user 20, a controller 40 that authenticates the portable tag 30, and a human sensor 50. In FIG. 1, only one user 20 carrying the portable tag 30 is shown. However, the security system may be used by a plurality of users 20. In this case, a plurality of portable tags 30 may be prepared. The plurality of portable tags 30 is respectively possessed by the plurality of users 20.

The portable tag 30 is compliant with the BLE standard. Alternatively, the portable tag 30 may use a wireless communication system other than the BLE standard. The portable tag 30 transmits a beacon signal regularly, for example, every second. BLE is abbreviation of Bluetooth Low Energy. The beacon signal transmitted from the portable tag 30 includes identification information for identifying the portable tag 30. In this case, each of the portable tag 30 and the controller 40 is equipped with a battery. That is, each of the portable tag 30 and the controller 40 is a battery device that operates by receiving power supply from the mounted battery.

In this case, the human sensor 50 is attached to the controller 40. The human sensor 50 detects a person with infrared rays, and operates by receiving power supply from a battery mounted on the controller 40. The human sensor 50 detects a person existing within a predetermined detection range, and corresponds to a human detection portion. The detection range may be set to a predetermined range centered on the controller 40, but may be set to a range slightly wider than a range in which the portable tag 30 and the controller 40 can communicate. The human sensor 50 may be attached to a different location from the controller 40. In other words, the human sensor 50 and the controller 40 may be separated with each other, and the human sensor 50 and the controller 40 may be connected with wired or wireless communication.

The controller 40 is normally in a sleep state. The controller 40 is configured to return from the sleep state and wake up (activate) when a person is detected by the human sensor 50. The controller 40 has an operation area 41 that can be operated by the user. In this case, when authenticating the portable tag 30, the authentication system 10 requires the user 20 to perform a predetermined operation on the operation area 41. In the present embodiment, the predetermined operation corresponds to a touch operation.

When the controller 40 returns from the sleep state to wake up, the controller 40 may be referred to be in an active state. The controller 40 waits for a signal indicative of detection by a human sensor 50 when the controller 40 turns on without performing a connection process and an authentication process; or the like. The controller 40 may become into the sleep state again after performing a normal-time notification process or an abnormal-time notification process.

(Configuration of Portable Tag and Controller)

Figure 2:
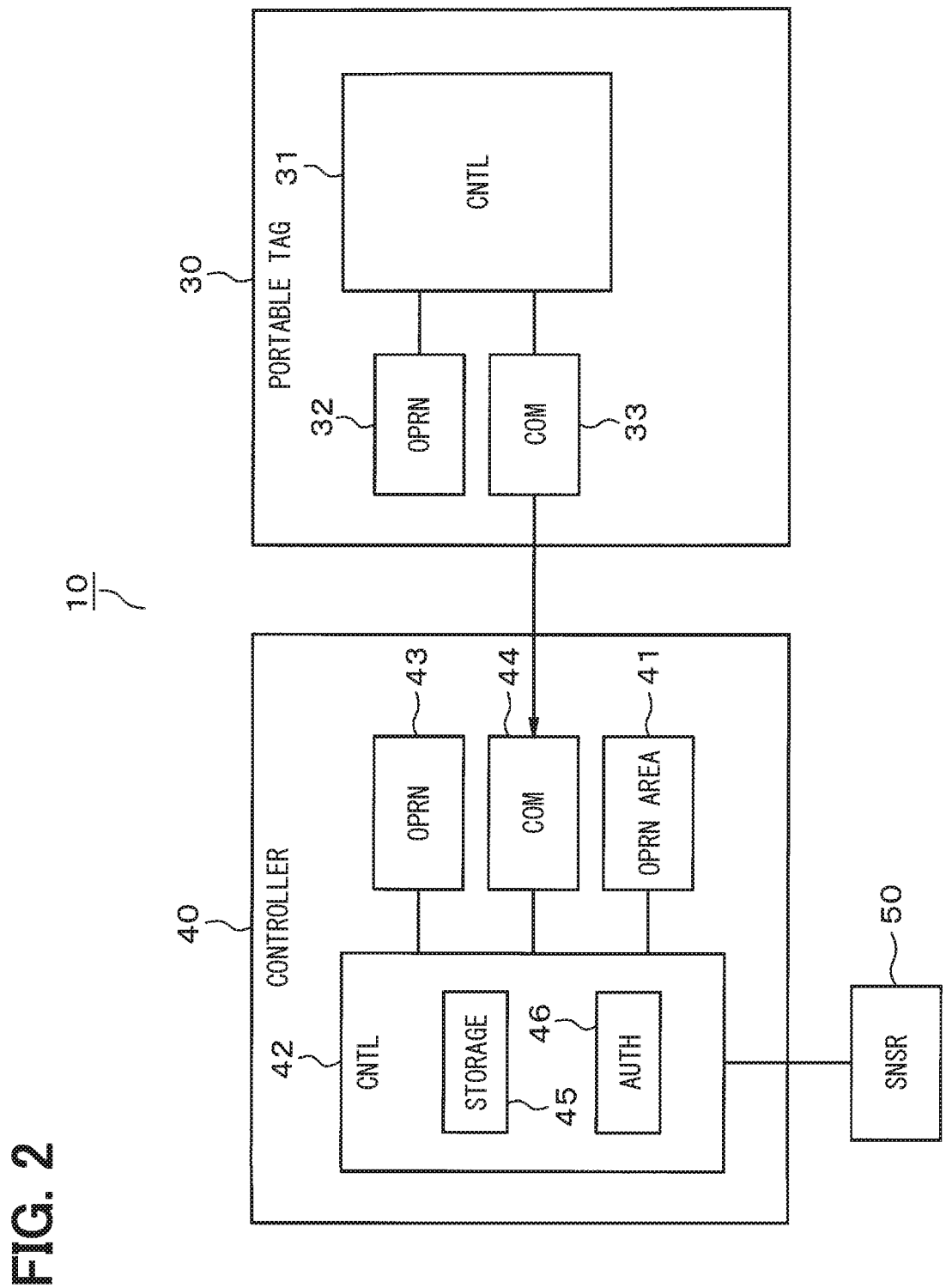
FIG. 2 is a diagram schematically showing a configuration of a portable tag and a controller according to the first embodiment.
Figure 3:
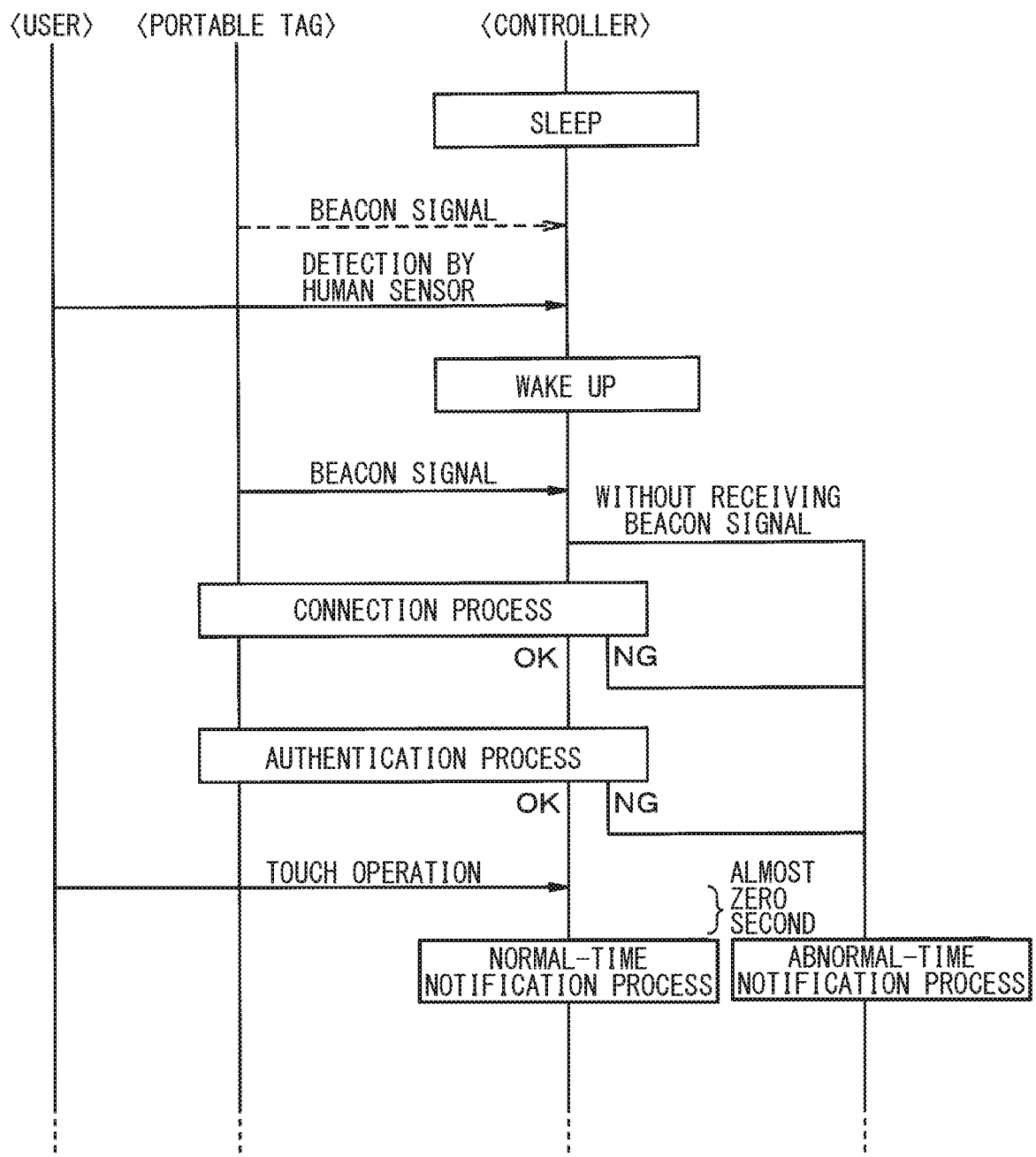
FIG. 3 is a diagram for explaining flow of authentication according to the first embodiment.

The portable tag 30 and the controller 40 have a function as shown in FIG. 2. Incidentally, each of the functions may be realized by software or hardware. Further, each of the functions may be realized by a combination of software and hardware. The portable tag 30 includes a control portion 31, an operation portion 32, and a communication portion 33. The control portion 31 controls the overall operation of the portable tag 30. The portable tag 30 includes an operation button (not shown). The operation portion 32 receives an operation on the operation button, and outputs an operation reception signal indicating the result to the control portion 31. When the control portion 31 receives an operation reception signal, the control portion 31 executes various processes according to the operation reception signal.

The control portion 31 provides the communication portion 33 with various information to be transmitted to the controller 40 such as identification information for identifying the terminal itself. The communication portion 33 transmits a beacon signal including these various types of information to the controller 40 by wireless communication. In this case, the beacon signal corresponds to an authentication request signal. The identification information is information for identifying the terminal itself. For example, the identification information is an ID assigned to each of the plurality of portable tags 30. The communication portion 33 communicates with the controller 40, and transmits the authentication request signal for requesting authentication. The communication portion 33 corresponds to a terminal-side communication portion of the present disclosure.

The controller 40 includes a control portion 42, an operation portion 43, and a communication portion 44. The control portion 42 controls the overall operation of the controller 40. The controller 40 includes an operation button (not shown). The operation portion 43 receives an operation on the operation button, and outputs an operation reception signal indicating the result to the control portion 42. When the control portion 42 receives the operation reception signal, the control portion 42 executes various processes according to the operation reception signal. The communication portion 44 receives the beacon signal transmitted from the portable tag 30 via wireless communication, and outputs the received beacon signal to the control portion 42. The communication portion 44 performs communication with the portable tag 30. The communication portion 44 corresponds to a controller-side communication portion in the present disclosure.

The control portion 42 includes a storage portion 45, an authentication portion 46, and a notification portion 47. The storage portion 45 stores in advance identification information of each portable tag 30. The authentication portion 46 is provided with a beacon signal received by the communication portion 44, a signal indicating a human detection result by the human sensor 50, and a signal indicating presence or absence of the touch operation on the operation area 41. The authentication portion 46 determines whether the portable tag 30 having transmitted the beacon signal is authenticated based on these signals and various information stored in the storage portion 45, that is, it is determined whether the authentication is OK or the authentication is NG.

When receiving the beacon signal, the authentication portion 46 communicates with the portable tag 30 via the communication portion 44. Thereby, the process for authentication for authenticating the portable tag 30, which has transmitted the beacon signal, is executed. The authentication process includes a connection process and an authentication process. In the connection process, it is determined whether the portable tag 30 that transmitted the beacon signal has been registered in advance. In the authentication process, it is determined genuineness of the portable tag 30 transmitted the beacon signal. The connection process corresponds to the first determination process. The authentication process corresponds to the second determination process.

In the connection process, by comparing the identification information included in the beacon signal with the identification information stored in the storage portion 45, the authentication portion 46 identifies the portable tag 30 having transmitted the beacon signal, and determines whether the portable tag 30 is registered in advance. In the authentication process, the authentication portion 46 exchanges various information such as a password by communicating with the portable tag 30 via the communication portion 44, and determines based on the result of exchanges, whether the portable tag 30 is genuine.

If the portable tag 30 is authenticated in the authentication process, that is, if the authentication is OK, the authentication portion 46 executes the normal-time notification process so as to notify that the portable tag 30 has been authenticated when the touch operation is performed on the operation area 41. If the portable tag 30 is not authenticated in the authentication process, that is, if the authentication is NG, the authentication portion 46 executes the abnormal-time notification process so as to notify that the portable tag 30 is not authenticated, regardless of whether there is the touch operation on the operation area 41.

The operation of the above configuration will be described with reference to FIG. 3.

(1) Action in a Case of the Authentication is OK

In the authentication system 10, when the user 20 holding the portable tag 30, which is legitimate, approaches the controller 40 and performs the touch operation, each process below is performed according to the following flow. The controller 40 is normally in a sleep state. In the sleep state, the controller 40 does not execute any process even if the beacon signal is transmitted from the portable tag 30.

When the human sensor 50 detects a person, the controller 40 returns from the sleep state and wakes up, that is, starts up. When the controller 40 receives the beacon signal transmitted from the portable tag 30 after the activation, the controller 40 executes the connection process. In this case, since the portable tag 30 possessed by the user 20 is genuine, it is determined in the connection process that the portable tag 30 that transmitted the beacon signal is registered in advance (OK).

When the result of the connection process is "OK", the controller 40 executes the authentication process. In this case, since the portable tag 30 possessed by the user 20 is genuine, it is determined in the authentication process that the portable tag 30 transmitted the beacon signal is genuine (OK). The controller 40 executes the normal-time notification process when the touch operation is performed on the operation area 41 in a case where the result of the authentication process is "OK".

In the normal-time notification process, the controller 40 notifies the user 20 by outputting a message indicating that the authentication is OK. The message is, for example, "The crime prevention measures have been released". In this case, the time from the time when the user 20 performs the touch operation on the operation area 41 to the time when the normal-time notification process is executed is only the time due to the operation delay in the controller 40. Therefore, sensory speed by the user 20 is almost 0 seconds.

(2) In a Case of the Authentication NG (Part 1)

In the authentication system 10, when the user 20 does not have a portable tag, each process is performed according to the following flow. In this case, the controller 40 does not receive the beacon signal even after the activation. When the controller 40 does not receive the beacon signal before the predetermined time elapses after the activation, the controller 40 performs the abnormal-time notification process. In the abnormal-time notification process, the controller 40 notifies the user 20 by outputting a message indicating authentication NG. The message is, for example, "Being in security. Please perform the release operation."

(3) In a Case of the Authentication NG (Part 2)

In the authentication system 10, when the user 20 has a portable tag 30 that is not registered in advance, or when the user 20 has a portable tag 30 other than a legitimate portable tag 30, each process is performed as follows. In this case, it is determined that the portable tag 30 transmitted the beacon signal in the connection process is not registered in advance (NG), or it is determined that the portable tag 30 transmitted the beacon signal in the authentication process is fake (NG). When the result of the connection process or the authentication process is "NG", the controller 40 executes the abnormal-time notification process.

At least of a part of the authentication process in the authentication system 10 of the present embodiment may be similar with the process in a related art. The authentication process includes the connection process and the authentication process. In this configuration, the time required for authentication is the time from when the controller 40 receives the beacon signal to when the normal-time notification process is executed. Therefore, even with the authentication system 10 according to the present embodiment, the time required for authentication may be substantially the same as the time required for authentication in a related art. However, according to the authentication system 10 of the present embodiment, the waiting time felt by the user during the authentication can be significantly shortened.

In the authentication system 10 of the present embodiment, the time that the user 20 feels just a waiting time corresponds to the time from when the user 20 performs the touch operation to when the normal-time notification process is executed. In the authentication system 10, the controller 40 returns from the sleep state, and starts up in response to that a person is detected by the human sensor 50. Therefore, the controller 40 can perform and complete the authentication process before the time point when the user 20 performs the touch operation. Incidentally, the authentication process corresponds to a connection process and an authentication process.

Therefore, when the portable tag 30 is authenticated in the authentication process, the controller 40 can immediately execute the normal-time notification process when the user 20 performs the touch operation. In other words, before the touch operation is performed by the user 20, the controller 40 is automatically activated to start and execute the authentication process. According to the configuration of the present disclosure, it is possible to proceed in advance the authentication process that requires a relatively long time. Therefore, in the authentication system 10, the time from the time when the touch operation is performed by the user 20 to the time when the normal-time notification process is executed, that is, the time that the user 20 feels as a mere waiting time is almost zero. Therefore, according to the authentication system 10 of the present embodiment, it is possible to significantly shorten the waiting time felt by the user 20 at the time of authentication as compared with the conventional authentication system.

When the portable tag 30 is not authenticated in the authentication process, the controller 40 executes the abnormal-time notification process for notifying that the portable tag 30 has not been authenticated, regardless of the presence or absence of the touch operation. According to the configuration, when the user 20 does not have a portable tag or when the user 20 has a portable tag not registered in advance or a portable tag other than a legitimate portable tag, it is possible to notify the user that the authentication is not performed, that is, the authentication NG, before receiving the touch operation. That is, according to the configuration, it is possible to further improve the response of the authentication system in the case of authentication NG.

In an authentication system of a related art, even if a malicious third party possessing a portable tag (that is, a fake portable tag) other than a legitimate portable tag approaches the controller, any kind of notification indicating that authentication NG is not performed unless a touch operation is performed. Therefore, threatening effect against a third party may be insufficient. On the other hand, according to the configuration of the present embodiment, when such a malicious third party enters the detection range of the human sensor 50, it is automatically notified that the authentication is NG. Therefore, according to the authentication system 10 of the present embodiment, it is possible to automatically perform a threatening operation against a malicious third party, and it is possible to improve security.

In the present embodiment, the controller 40 is a battery device that operates by receiving power supply from a mounted battery. In this case, as a human detection portion for detecting a person, the human sensor 50 for detecting a person with infrared rays is employed. The human sensor 50 operates by receiving power supply from a battery mounted on the controller 40. According to such a configuration, a general human sensor widely used as the human detection portion may be employed. Since the human sensor 50 has a configuration using infrared rays, its power consumption is kept low. Therefore, according to the configuration, it is possible to suppress electricity consumption of the battery of the controller 40 which is a battery apparatus. It is possible to reduce the frequency of battery replacement.

Second Embodiment

Figure 4:
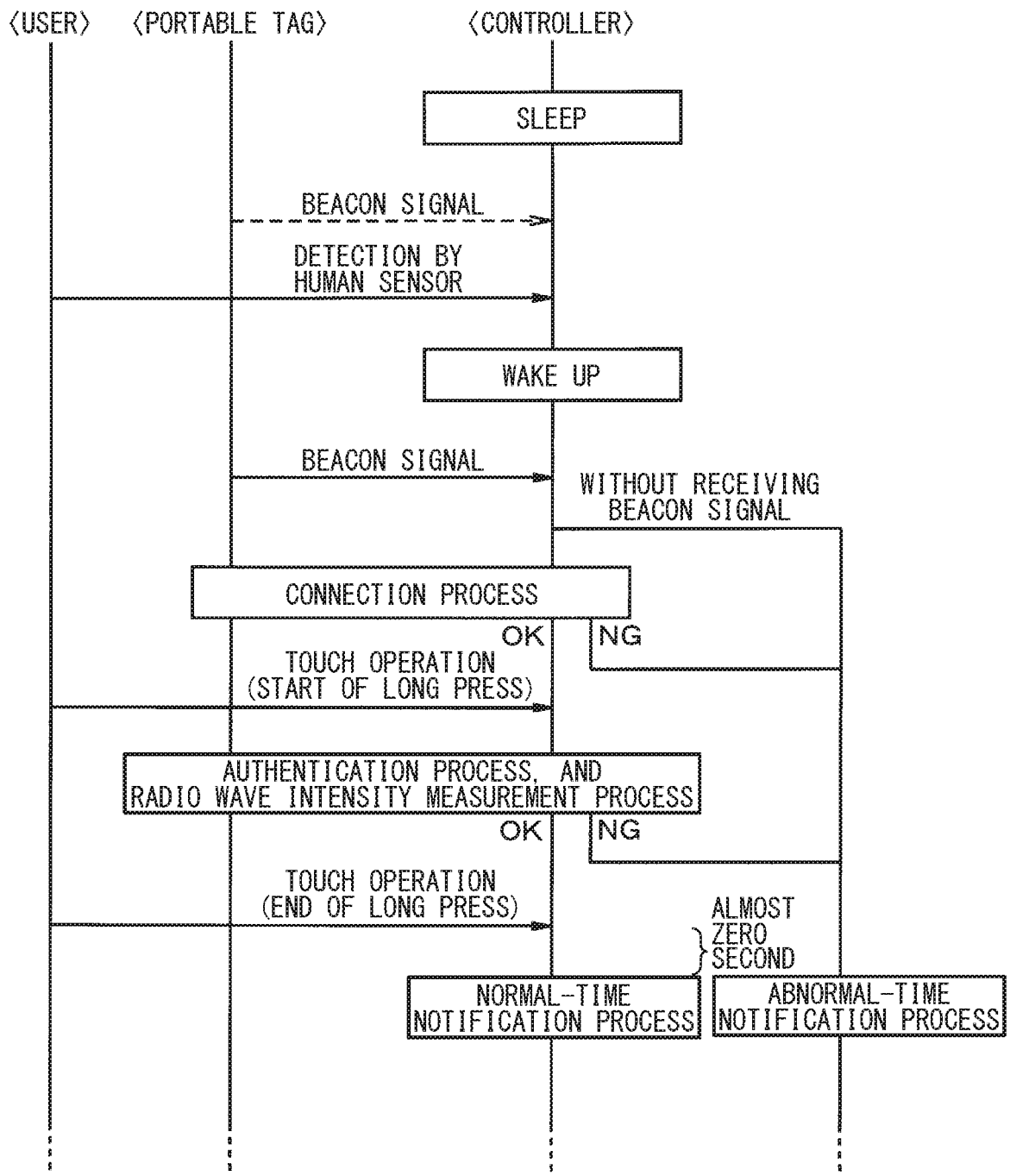
FIG. 4 is a diagram explaining flow of authentication according to a second embodiment.

The second embodiment will be described below with reference to FIG. 4.

In the authentication process in the first embodiment, in a situation where the authorized user 20 having the portable tag 30 is in a range where communication with the controller 40 is possible, and also when a person other than the user 20 operates the touch operation, for example, for the purpose of mischief or the like with respect to the operation area of the controller, authentication may be erroneously performed although the person other than the user 20 is not a legitimate user. According to the authentication process of the second embodiment, it is possible to further improve security in a specific situation.

In the present embodiment, the contents of the authentication process are changed with respect to the first embodiment. The authentication process of the present embodiment includes a radio wave intensity measurement process for measuring the radio wave intensity of a signal transmitted from the portable tag 30 in the authentication process, in addition to the connection process and the authentication process. In this case, when a long press operation on the operation area 41 is started in a state where it is determined by the connection process that the portable tag 30 has been registered in advance, the controller 40 executes an authentication process and a radio wave intensity measurement process.

When both the condition that the portable tag 30 is determined to be authentic by the authentication process and the condition that the radio wave intensity measured by the radio wave intensity measurement process is greater than or equal to a predetermined determination threshold are satisfied, the normal-time notification process is executed when the long press operation on the operation area 41 is completed. The determination threshold is set to a value comparable to the radio wave intensity when the user 20 carrying the portable tag 30 exists in the vicinity of the controller 40. The vicinity may be a position facing the controller 40.

When at least one of the condition that the portable tag 30 is determined to be authentic by the authentication process and the condition that the radio wave intensity measured by the radio wave intensity measurement process is equal to or greater than the determination threshold is not satisfied, the controller 40 performs the abnormal-time notification process, regardless of whether or not the long press operation on the operation area 41 ends. In other words, when the condition that the portable tag 30 is determined to be authentic by the authentication process is not satisfied, or the condition that the radio wave intensity measured by the radio wave intensity measurement process is equal to or greater than the determination threshold is not satisfied, or the two of the conditions are not satisfied, the controller 40 performs the abnormal-time notification process, regardless of whether or not the long press operation on the operation area 41 ends. The long press operation is not an operation that immediately releases (touches) the operation area 41, which is the operation target, but means an operation that presses (touches) for a certain period of time or longer.

(1) Action in a Case of the Authentication is OK

In the present embodiment, when the user 20 holding the legitimate portable tag 30 approaches the controller 40 and performs the long press operation, each process is performed according to the following flow. In this case, when the human sensor 50 detects a person, the controller 40 returns from the sleep state and wakes up (starts up), and executes a connection process when receiving a beacon signal transmitted from the portable tag 30. In this case, since the portable tag 30 possessed by the user 20 is genuine, it is determined in the connection process that the portable tag 30 that transmitted the beacon signal is registered in advance (OK).

When the result of the connection process is "OK", the controller 40 executes the authentication process and the radio wave intensity measurement process when the long press operation on the operation area 41 is started. In this case, the portable tag 30 possessed by the user 20 is genuine, and the user 20 is approaching the controller 40 and performing the long press operation. Therefore, both the condition that the portable tag 30 that transmitted the beacon signal in the authentication process is determined to be genuine and the condition that the radio wave intensity measured by the radio wave intensity measurement process is equal to or greater than the determination threshold are satisfied (OK). When both of these conditions are satisfied, the controller 40 executes the normal-time notification process when the long press operation on the operation area 41 is completed.

(2) In a Case of the Authentication NG (Part 1)

When the user 20 does not have a portable tag, each process is performed according to the following flow. In this case, the controller 40 does not receive the beacon signal even after the activation. Therefore, when the controller 40 does not receive the beacon signal after the activation until a predetermined time elapses, the controller 40 performs the abnormal-time notification process.

(3) In a Case of the Authentication NG (Part 2)

When the user 20 has a portable tag that is not registered in advance, or when the user 20 has a portable tag other than a legitimate portable tag, each process is performed according to the following flow. In this case, it is determined that the portable tag 30 transmitted the beacon signal in the connection process is not registered in advance (NG), or it is determined that the portable tag 30 transmitted the beacon signal in the authentication process is fake (NG). When the result of the connection process or the authentication process is "NG", the controller 40 executes the abnormal-time notification process.

(4) In a Case of the Authentication NG (Part 3)

It is assumed that a person other than the legitimate user 20 performs the long press operation on the operation area 41 in a situation where the legitimate user 20 having the portable tag 30 is in a range where communication with the controller 40 is possible. In this case, each process is performed as follows. In this case, the legitimate user 20 is not in the vicinity of the controller 40. Therefore, the radio wave intensity measured by the radio wave intensity measurement process is less than the determination threshold, and the at least one of the above conditions is not satisfied (NG). When the at least one of the above-described conditions is not satisfied, the controller 40 performs the abnormal-time notification process, regardless of whether or not the long press operation on the operation area 41 ends.

The authentication process of the present embodiment includes the radio wave intensity measurement process for measuring the radio wave intensity of a signal transmitted from the portable tag 30 in the authentication process. In this case, when the long press operation on the operation area 41 is started in a state where it is determined by the connection process that the portable tag 30 has been registered in advance, the controller 40 executes the authentication process and the radio wave intensity measurement process.

When both the condition that the portable tag 30 is determined to be genuine by the authentication process and the condition that the radio wave intensity measured by the radio wave intensity measurement process is greater than or equal to the determination threshold are satisfied, the controller 40 performs the normal-time notification process when the long press operation on the operation area 41 is completed. The long press operation in this case is an operation in which the operation area 41 is not touched and released immediately, but is kept touched for a certain time period. In other words, the long press operation is an operation in which the operation area 41 has been touched for a certain period of time or longer. Therefore, a person (user) cannot perform the long press operation while walking in general. It may be necessary to stop in the vicinity of the controller 40 when performing the long press operation. The vicinity is, for example, a position facing the controller 40.

The determination threshold is set to a value that is approximately the same as the radio wave intensity when the user 20 carrying the portable tag 30 exists in the vicinity of the controller 40. When the authorized user 20 performs the long press operation on the operation area 41, both of the above conditions are satisfied, and the authentication is normally completed. On the other hand, when the legitimate user 20 is in a range where communication with the controller 40 is possible and also when a person other than the user 20 performs the long press operation on the operation area 41, the radio wave intensity is less than the determination threshold. It is possible to prevent the authentication from being accepted by mistake.

It is assumed that when the legitimate user 20 moves so as to pass in the vicinity of the controller 40, a person other than the user 20 performs a long press operation on the operation area 41. In that case, since the legitimate user 20 moves away from the vicinity of the controller 40 until the long press operation is completed, the radio wave intensity becomes less than the determination threshold value, so that there is no case where the authentication is erroneously OK. That is, in the present embodiment, the operation is not completed instantaneously, and the user 20 is caused to perform the long press operation that requires a certain period time for the operation. With this configuration, in the specific situation as described above, it is possible to prevent erroneous authentication by gaining time until the authorized user 20 leaves the vicinity of the controller 40.

In this case, the authentication process includes the radio wave intensity measurement process, in addition to the connection process and the authentication process originally performed for authentication. In the present embodiment, the time required for the authentication process is increased by the radio field intensity measurement process, which is added.

In this case, the predetermined operation on the operation area 41 corresponds to the long press operation. Therefore, according to the present embodiment, the controller 40 performs each process such as the authentication process and the radio wave intensity measurement process while the user 20 is performing the long press operation that keeps touching the operation area 41 for a certain period time.

In this case, the time that the user 20 feels a mere waiting time corresponds to the time from when the long press operation by the user 20 is completed to when the normal-time notification process is executed. It is possible that the time that the user 20 feels a mere waiting time is almost zero. It is possible to greatly reduce the waiting time which the user 20 feels at the time of the authentication, and it is possible to improve the security in a specific situation.

OTHER EMBODIMENTS

The present disclosure is not limited to the embodiments described above and illustrated in the drawings. The present disclosure may be arbitrarily modified, combined, or expanded without departing from the scope thereof.

Numerical values and the like shown in the above embodiments are examples and are not limited thereto.

The present disclosure is not limited to the authentication system 10 used in the security system, but can be applied to all authentication systems including a portable terminal carried by a user and a controller that performs authentication of the portable terminal.

The portable terminal is not limited to the portable tag 30, and various modes such as an IC card may be used.

The wireless communication between the portable terminal and the controller is not limited to a communication based on the BLE standard. The wireless communication of various standards may be adopted.

The human detection portion is not limited to the human sensor 50. The human detection portion only needs to be able to detect a person existing within a predetermined detection range, and may be, for example, a camera or a laser radar device.

The controller 31 may include a microcomputer including a CPU and a storage medium such as a ROM, a RAM, and a rewritable flash memory. The storage medium may store a software performing the above described functions. The controller 42 may include a microcomputer including a CPU and a storage medium such as a ROM, a RAM, and a rewritable flash memory. The storage medium may store a software performing the above described functions.

The long press operation in the present disclosure may be about one second. The operation area 41 may be an operation button.

While various embodiments, configurations, and aspects of authentication system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An authentication system comprising:
a portable terminal carried by a user;
a controller that authenticates the portable terminal; and
a human detection portion that is configured to detect a person existing within a predetermined detection range,
wherein:
the portable terminal includes a terminal-side communication portion that communicates with the controller and transmits an authentication request signal, which requests authentication of the portable terminal;
the controller includes
a controller-side communication portion communicating with the portable terminal, and
an operation area that is configured to be operated by the user;
the controller is in a sleep state normally;
the controller returns from the sleep state to start up to be in an active state in response to the human detection portion detects the person;
the controller communicates with the portable terminal through the controller-side communication portion in response to reception of the authentication request signal in the active state and performs an authentication process that authenticates the portable terminal which has transmitted the authentication request signal;
the controller performs a normal-time notification process that notifies that the portable terminal is authenticated, in response to that a predetermined operation is performed on the operation area after the portable terminal has been authenticated in the authentication process;
the authentication process includes a determination process and a radio wave intensity measurement process;
the determination process determines whether the portable terminal having transmitted the authentication request signal is genuine or not;
the radio wave intensity measurement process measures radio wave intensity of a signal transmitted from the portable terminal during the determination process;
the controller performs the determination process and the radio wave intensity measurement process in response to a start of a long press operation to the operation area; and
the controller performs the normal-time notification process in response to that the long press operation to the operation area ends under a situation where both a condition in which the determination process determines that the portable terminal is genuine and a condition in which the radio wave intensity measurement process determines that the measured radio wave intensity is equal or more than a predetermined determination threshold are satisfied.

2. The authentication system according to claim 1, wherein:
the controller performs an abnormal-time notification process that notifies that the portable terminal is not authenticated, in response to that the portable terminal has not been authenticated in the authentication process;
the controller performs the abnormal-time notification process irrespective of whether the predetermined operation is performed on the operation area or not.

3. The authentication system according to claim 1, wherein:
the controller is a battery device that operates by receiving power supply from a battery mounted on the controller;
the human detection portion is a human sensor that detects a person with infrared rays; and
the human sensor operates by receiving the power supply from the battery.

4. The authentication system according to claim 1, wherein:
the determination process further determines whether the portable terminal having transmitted the authentication request signal is a portable terminal which is registered in advance.

5. An authentication system comprising:
a portable tag carried by a user;
a controller that authenticates the portable tag; and
a sensor that is configured to detect a person existing within a predetermined detection range,
wherein:
the portable tag is configured to communicate with the controller and transmits an authentication request signal, which requests authentication of the portable tag;
the controller is configured to communicate with the portable tag;
the controller includes an operation area that is configured to be operated by the user;
the controller returns from a sleep state to start up to be in an active state in response to the sensor detects the person;
the controller communicates with the portable tag through the controller in response to reception of the authentication request signal in the active state, and performs an authentication process that authenticates the portable tag which has transmitted the authentication request signal;
the controller notifies that the portable tag is authenticated, in response to that a predetermined operation is performed on the operation area after the portable terminal has been authenticated in the authentication process;
the authentication process includes a determination process and a radio wave intensity measurement process;
the determination process determines whether the portable tag which has transmitted the authentication request signal is genuine or not;
the radio wave intensity measurement process measures radio wave intensity of a signal transmitted from the portable tag during the determination process;
the controller performs the determination process and the radio wave intensity measurement process in response to a start of a long press operation to the operation area; and
the controller performs the normal-time notification process in response to that the long press operation to the operation area ends under a situation where both a condition in which the determination process determines that the portable tag is genuine and a condition in which the radio wave intensity measurement process determines that the measured radio wave intensity is equal or more than a predetermined determination threshold are satisfied.

* * * * *